United States Patent
Fernihough et al.

(10) Patent No.: US 6,811,379 B2
(45) Date of Patent: Nov. 2, 2004

(54) TIP MATERIAL FOR A TURBINE BLADE AND METHOD OF MANUFACTURING OR REPAIRING A TIP OF A TURBINE BLADE

(75) Inventors: John Fernihough, Ennetbaden (CH); Maxim Konter, Klingnau (CH); Andreas Bögli, Wettingen (CH)

(73) Assignee: Alstom Technology LTD, Baden (CH)

( * ) Notice: Subject to any disclaimer, the term of this patent is extended or adjusted under 35 U.S.C. 154(b) by 0 days.

(21) Appl. No.: 10/442,979

(22) Filed: May 22, 2003

(65) Prior Publication Data

US 2003/0194323 A1 Oct. 16, 2003

Related U.S. Application Data

(62) Division of application No. 09/821,091, filed on Mar. 30, 2001, now Pat. No. 6,588,103.

(30) Foreign Application Priority Data

Apr. 3, 2000 (EP) ............................................. 00107245

(51) Int. Cl.$^7$ ................................................. F01D 5/14
(52) U.S. Cl. ............................... 416/241 R; 416/223 A
(58) Field of Search .................... 29/889.1; 416/241 R, 416/224, 223 A

(56) References Cited

U.S. PATENT DOCUMENTS

| | | |
|---|---|---|
| 4,155,152 A | 5/1979 | Cretella et al. |
| 4,214,355 A | 7/1980 | Zelahy |
| 4,390,320 A | 6/1983 | Eiswerth |
| 4,400,915 A | 8/1983 | Arrigoni |
| 4,789,441 A | 12/1988 | Foster et al. |
| 4,832,252 A | 5/1989 | Fraser |
| 4,878,953 A * | 11/1989 | Saltzman et al. ........... 29/889.1 |
| 5,173,255 A * | 12/1992 | Ross et al. .................. 420/445 |
| 5,316,866 A * | 5/1994 | Goldman et al. ............ 428/621 |
| 5,507,623 A | 4/1996 | Kojima et al. |
| 5,622,638 A | 4/1997 | Schell et al. |
| 5,711,068 A | 1/1998 | Salt |
| 5,794,338 A * | 8/1998 | Bowden et al. ............. 29/889.1 |
| 5,898,994 A | 5/1999 | Miller et al. |
| 5,913,555 A | 6/1999 | Richter et al. |
| 6,042,879 A | 3/2000 | Draghi et al. |
| 6,302,318 B1 | 10/2001 | Hasz et al. |
| 6,398,103 B2 | 6/2002 | Hasz et al. |
| 6,416,882 B1 | 7/2002 | Beele et al. |
| 6,440,575 B1 | 8/2002 | Heimberg et al. |
| 2001/0006187 A1 | 7/2001 | Hasz et al. |

FOREIGN PATENT DOCUMENTS

| | | |
|---|---|---|
| EP | 0361655 A2 | 4/1990 |
| EP | 0676259 A1 | 10/1995 |

* cited by examiner

*Primary Examiner*—Edward K. Look
*Assistant Examiner*—Richard A. Edgar
(74) *Attorney, Agent, or Firm*—Burns, Doane, Swecker & Mathis, L.L.P.

(57) ABSTRACT

A tip material for a turbine blade or for repairing a damaged tip of a turbine blade having a metallic coating, the material used for the tip is equivalent in composition to the metallic coating material used for the turbine blade. Also disclosed is a method of manufacturing or repairing a tip of a turbine blade having a metallic coating by reforming the blade tip with a material equivalent in composition to the metallic coating material used for the turbine blade by bonding the material to the damaged tip.

20 Claims, No Drawings

TIP MATERIAL FOR A TURBINE BLADE AND METHOD OF MANUFACTURING OR REPAIRING A TIP OF A TURBINE BLADE

This application is a divisional of U.S. application Ser. No. 09/821,091, filed on Mar. 30, 2001, now U.S. Pat. No. 6,588,103, and allowed on Feb. 20, 2003.

FIELD OF THE INVENTION

The invention relates to a tip material for a turbine blade or for a method of manufacturing or repairing a damaged tip of a turbine blade having a metallic coating.

BACKGROUND OF THE INVENTION

Turbine components such as blades or vanes operate at high temperatures and under conditions of extreme environmental attack such as oxidation. The tip of turbine blades is normally the point of highest temperature on the part, and is especially subject to degradation by oxidation and/or wear. Conditions at the blade tip are often so extreme that ceramic thermal barrier coatings and oxidation resistant coatings experience limited lives and are ultimately consumed before the blade is removed from service for repair. It is therefore common for the tips of blades to require partial or complete replacement during the repair/reconditioning intervals.

As a result, several disclosures have been made regarding methods and materials to be used for the replacement procedure. There are generally two approaches to replacing the tip: removing by some method the damaged part of the tip until high quality material is exposed, then a progressive build-up using any welding overlay procedure or the brazing or welding of a previously manufactured coupon of material to the newly exposed surface of the tip. U.S. Pat. No. 5,794,338 discloses the practice of not removing coating adjacent to the tip face to be repaired, whereas standard practice was to remove such adjacent coating material up to several mm below the repair surface so that it does not interfere with the repair operations.

It is further known that the replacement material should be wear resistant or oxidation resistant as in U.S. Pat. No. 5,622,638, where a composition is given which is significantly different from the base composition of the underlying blade and has no specified relationship to the coating material used for the part.

In some disclosures, such as U.S. Pat. No. 4,832,252, materials for tip replacements are used that are compatible with or equivalent to the base material. However, these references do not disclose that there is any particular advantage to the materials being the same or different.

It is always problematic to find a Ni based alloy that will be compatible with a second Ni based alloy upon which it is deposited and left in contact at high temperatures for extended periods of time because of the inter-diffusion zone that forms between the two alloys. This problem is made worse when the two materials are mixed over a certain zone, as in welding. It is known that each precipitation strengthened nickel based alloy is carefully designed and balanced so as to precipitate a desired volume fraction of strengthening (but brittle) gamma prime as cuboidal precipitates separated by softer gamma phase. Each alloy is also carefully formulated to avoid the precipitation of harmful TCP (topologically close packed) phases, which seriously degrade high temperature properties. When two alloys are allowed to diffuse into each other across an interface, the careful balance of alloying elements is seriously disrupted in the region of inter-diffusion where the two alloys effectively mix. The result is often that continuous bands of brittle gamma prime form and there is relatively heavy precipitation of TCP phases (needles and/or plates), both serving as easy crack paths. Failure often occurs as cracks propagate not in the alloys, but in the inter-diffusion zone between the alloys.

This is particularly problematic when one alloy is rich in Al and Cr as in oxidation resistant materials, because increasing a base material composition in these elements promotes the strongest undesirable precipitates. It is particularly at the high temperatures experienced at the blade tip that gamma prime banding and TCP phases precipitation occurs the most rapidly and to the greater volume fraction, severely degrading high temperature properties. The aero-engine centered repair industry may not face this problem to a great extent due to the relatively short operating lives of aero-engine components between repair intervals. However, industrial and heavy-duty land based gas turbine components experience much longer continuous operating times between repair intervals and are more sensitive to such alloy-alloy interactions at the tip.

SUMMARY OF THE INVENTION

Accordingly, the invention provides a tip material that will minimize the harmful precipitation in the region of both the coating-tip and base material-tip interfaces.

In an embodiment of the invention, the material used for the tip is equivalent in composition to the coating material used for the alloy or a modified version of the coating composition in which the yttrium content (or other rare earth element) is controlled to smaller amounts, in the range of 5–1000 ppm, preferred range 15–200 ppm.

The advantages of the invention can be seen, inter alia, in the fact that the problems in the inter-diffusion zone between the material of the tip and the blade are minimized because the coating has already been developed to minimize problems in the inter-diffusion zone between the blade and the coating.

The precipitation of harmful TCP (topologically close packed) phases is avoided and therefore the danger of propagation of cracks in the inter-diffusion zone is reduced.

As no third materials are being used to replace the tip, there are no compatibility problems in the new tip—blade interface, or in the new tip—extra coating interface, as they are equivalent in composition.

Because of the intentional yttrium additions, which may either be the same as in the coating alloy (generally around 3000 PPM) or controlled to a smaller amount in the range of 5–1000 ppm, preferred range 15–200 ppm, it has been found unexpectedly that in said range of yttrium contents, weldability is improved to acceptable levels while oxidation resistance is maintained.

The advantage of the present invention over the prior art is that the replacement tip will not experience any welding incompatibilities with the original part coating to which it is welded, and minimal incompatibilities with the base material of the component itself, since the coating was designed to be in contact with the base material. Furthermore, the replacement tip will never need additional environmentally resistant coatings other than thermally insulating TBC coatings when desired. This saves considerable processing time and money during the repair of the component.

Moreover, a method of manufacturing or repairing a tip of a turbine blade having a metallic coating is further specified.

Even if the new tip material is welded or added directly to the coating, there are no problems in the mixing zone between the original coating and the new tip material as they are equivalent in composition. In addition to being perfectly compatible with the old coating, there are minimal incompatibility problems with welding or bonding to the blade material.

DESCRIPTION OF THE PREFERRED EMBODIMENTS

The present invention provides an improved blade tip for turbine blades used in gas turbine engines, and particularly turbine blades used in the high-pressure turbine section of axial flow gas turbine engines.

The blade is preferably formed from a suitable high temperature material, such as an appropriate nickel-based superalloy of the type known in the art, and may be cast as a single crystal or directionally solidified casting to promote the high temperature properties of the blade.

In accordance with this invention, the tip material is equivalent to the oxidation resistant coating material used for the nickel-base superalloy of the blade. An equivalent material is defined herein as a material that has overlapping or nearby composition ranges to the referring material and some optional elements. Additionally, the rare earth element content can be controlled to smaller amounts. For a superalloy known as MK4 and disclosed in U.S. Pat. No. 5,759, 301 with a compositional range of, noted in mass percent, 6.3–6.6% Cr, 9.3–10% Co, 0.5–0.7% Mo, 6.2–6.6% W, 6.3–6.7% Ta, 2.8–3.1% Re, 5.45–5.75% Al, 0.9–1.1% Ti, 0.17–0.23% Hf, 0.02–0.03% C, 50–80 ppm B, balance Ni, a coating known as SV34 with a compositional range of, noted in mass percent, 11.8–12.8% Cr, 23.5–24.5% Co, 0.4–0.6% Y, 2.8–3.0% Re, 11.6–12.2% Al, 0.4–0.6% Ta, 0.8–1.2% Si, max 0.03% C, max 400 ppm O, max 100 ppm N, max 10 ppm S, balance Ni could be used.

The material used for the tip is the same as the above coating material. It is also possible to use a modified equivalent version of the coating composition in which the rare earth element content is controlled to smaller amounts, in the range of 5–1000 ppm, preferred range 15–200 ppm.

The most preferred rare earth element is yttrium which content is therefore controlled to smaller amounts, in the range of 5–1000 ppm, preferred range 15–200 ppm.

For the tip also another coating B which is equivalent to the above coating SV34 with a compositional range of, noted in mass percent, Cr 12–14%; Al 11–12%; Co 24–34%; Si 1–2%; Ta 0.5–1.05%; Y 0.3–0.5%; Re 0–3%; Ni balance can be used. The rare earth element, preferably yttrium content of this coating composition can also be altered to smaller amounts, in the range of 5–1000 ppm, preferred range 15–200 ppm. This material can also be used as the base coating instead of the above SV34, the tip can then be made of this coating B, the above equivalent coating SV34 or their above altered versions.

The above superalloy known as MK4 can also be coated by a coating known as SV20 with a compositional range of, noted in mass percent, 24.0–26.0% Cr, 5.0–6.0% Al, 2.5–3.0% Si, 0.5–0.8% Y, 0.8–1.2% Ta, max 0.03% C, max 400 ppm O, max 100 ppm N, balance Ni could be used.

The material used for the tip is the same as the above coating material. It is also possible to use a modified equivalent version of the coating composition in which the rare earth element content, most preferred rare earth element is yttrium, is controlled to smaller amounts, in the range of 5–1000 ppm, preferred range 15–200 ppm.

For the tip also another coating A which is equivalent to the above coating SV20 with a compositional range of, noted in mass percent, Cr 13–26%; Al 5.5–7.5%; Co 0–15%; Si 0.7–3%; Ta 1–1.5%; Y 0.3–0.5%; Re 0–3%; Nb 0–1% Ni balance can be used. The rare earth element, preferably yttrium content of this coating composition can also be altered to smaller amounts, in the range of 5–1000 ppm, preferred range 15–200 ppm. This material can also be used as the base coating instead of the above SV20, the tip can then be made of this coating A, the above equivalent coating SV20 or their above altered versions.

The tip of the turbine blade can be built up or repaired by well-known methods such as laser welding or TIG (Tungsten Inert Gas) welding or plasma arc spraying or HVOF (High Velocity Oxy-Fuel) or galvanic deposition, wherein the most preferred method is laser welding. Normally powder or wire weld material can be used to deposit the material.

The tip material can also be deposited by brazing a preform to the blade tip, where the preform may have a preferred crystallographic orientation relative to the component when the component is a single crystal. Preferably the total misorientation between the preform and component is not greater than 15°.

The tip can also be repaired according to U.S. Pat. No. 5,794,338, which is incorporated herein by reference. The method includes removing the damaged, coated tip to provide a preform end surface on the member without first removing any of the coating on the outer wall adjacent the tip. The coating is retained on the wall adjacent the preform end surface, as well as within any hollow tip interior or recess. A replacement tip material as described above is bonded to the end surface to provide a repaired member preform having a second length greater than the designed length. Then a portion of the replacement tip material is removed to provide the member with a repaired member tip of substantially the designed length, while retaining the coating on the wall adjacent the repaired members tip.

Following the manufacturing or repairing of a tip according to the above teachings, a thermal barrier coating can be applied to the surface of the blade.

The invention is of course not restricted to the exemplary embodiments shown and described. Further equivalent coatings to the above mentioned coatings could be used as tip replacement materials. As mentioned above any suitable high temperature material can be used to form the blade.

Obviously, numerous modifications and variations of the present invention are possible in light of the above teachings. It is therefore to be understood that within the scope of the appended claims, the invention may be practiced otherwise than as specifically described herein.

What is claimed is:

1. The tip material for a turbine blade or for repairing a damaged tip of a turbine blade having a metallic coating material, wherein the material used for the tip is equivalent in composition to the metallic coating material used for the turbine blade.

2. The tip material as claimed in claim 1, wherein the material used for the tip is the same as the metallic coating material used for the turbine blade.

3. The tip material as claimed in claim 1, wherein a modified version of the coating composition is used in which a rare earth element content of the material used for the tip is reduced to amounts in the range of 5–1000, ppm which is below the rare earth element content of the metallic coating material.

4. The tip material as claimed in claim 3, wherein the rare earth element is Yttrium.

5. The tip material as claimed in claim 3, wherein the material used for the tip is welded to the turbine blade.

6. The tip material as claimed in claim 1, wherein a modified version of the coating composition is used in which a rare earth element content of the material used for the tip is reduced to amounts in the range of 15–200 ppm, which is below the rare earth element content of the metallic coating material.

7. The tip material as claimed in claim 6, wherein the rare earth element is Yttrium.

8. The tip material as claimed in claim 1, wherein:

the material of the turbine blade comprises, in mass percent, 6.3–6.6% Cr, 9.3–10% Co, 0.5–0.7% Mo, 6.2–6.6% W, 6.3–6.7% Ta, 2.8–3.1% Re, 5.45–5.75% Al, 0.9–1.1% Ti, 0.17–0.23% Hf, 0.02–0.03% C, 50–80 ppm B, balance Ni;

the metallic coating material comprises, in mass percent, 11.8–12.8% Cr, 23.5–24.5% Co, 0.4–0.6% Y, 2.8–3.0% Re, 11.6–12.2% Al, 0.4–0.6% Ta, 0.8–1.2% Si, max 0.03% C, max 400 ppm O, max 100 ppm N, max 10 ppm S, balance Ni; and the material used for the tip has a composition that is (i) the same as that of the metallic coating material, or (ii) equivalent to the metallic coating material and has a rare earth element content in the range of 5–1000 ppm, which is below the rare earth element content of the metallic coating material.

9. The tip material as claimed in claim 1, wherein:

the material of the turbine blade comprises, in mass percent, 6.3–6.6% Cr, 9.3–10% Ca, 0.5–0.7% Mo, 6.2–6.6% W, 6.3–6.7% Ta, 2.8–3.1% Re, 5.45–5.75% Al, 0.9–1.1% Ti, 0.17–0.23% Hf, 0.02–0.03% C, 50–80 ppm B, balance Ni;

the metallic coating material comprises, in mass percent, 12–14% Cr, 24–34% Ca, 0–3% Re, 11–12% Al, 0.5–1.05% Ta, 1–2% Si, 0.3–0.5% Y, balance Ni; and the material used for the tip has a composition that is (i) the same as that of the metallic coating material, or (ii) equivalent to the metallic coating material and has a rare earth element content in the range of 5–1000 ppm, which is below the rare earth element content of the metallic coating material.

10. The tip material as claimed in claim 1, wherein:

the material of the turbine blade comprises, in mass percent, 6.3–6.6% Cr, 9.3–10% Co, 0.5–0.7% Mo, 6.2–6.6% W, 6.3–6.7% Ta, 2.8–3.1% Re, 5.45–5.75% Al, 0.9–1.1% Ti, 0.17–0.23% Hf, 0.02–0.03% C, 50–80 ppm B, balance Ni;

the metallic coating material comprises, in mass percent, 12–14% Cr, 24–34% Ca, 0–3% Re, 11–12% Al, 0.5–1.05% Ta, 1–2% Si, 0.3–0.5% Y, balance Ni; and the material used for the tip comprises, in mass percent, 11.8–12.8% Cr, 23.5–24.5% Ca, 0.4–0.6% Y, 2.8–3.0% Re, 11.6–12.2% Al, 0.4–0.6% Ta, 0.8–1.2% Si, max 0.03% C, max 400 ppm O, max 100 ppm N, max 10 ppm S, balance Ni.

11. The tip material as claimed in claim 1, wherein:

the material of the turbine blade comprises, in mass percent, 6.3–6.6% Cr, 9.3–10% Co, 0.5–0.7% Mo, 6.2–6.6% W, 6.3–6.7% Ta, 2.8–3.1% Re, 5.45–5.75% Al, 0.9–1.1% Ti, 0.17–0.23% Hf, 0.02–0.03% C, 50–80 ppm B, balance Ni;

the metallic coating material comprises, in mass percent, 24.0–26.0% Cr, 5.0–6.0% Al, 0.8–1.2% Ta, 2.5–3.0% Si, 0.5–0.8% Y, max 0.03% C, max 400 ppm O, max 100 ppm N, balance Ni; and the material used for the tip has a composition which is (i) the same as that of the metallic coating material, or (ii) equivalent to the metallic coating material and has a rare earth element content in the range of 5–1000 ppm, which is below the rare earth element content of the metallic coating material.

12. The tip material as claimed in claim 1, wherein:

the material of the turbine blade comprises, in mass percent, 6.3–6.6% Cr, 9.3–10% Co, 0.5–0.7% Mo, 6.2–6.6% W, 6.3–6.7% Ta, 2.8–3.1% Re, 5.45–5.75% Al, 0.9–1.1% Ti, 0.17–0.23% Hf, 0.02–0.03% C, 50–80 ppm B, balance Ni;

the metallic coating material comprises, in mass percent, 13–26% Cr, 0–15% Co, 5.5–7.5% Al, 1–1.5% Ta, 0.7–3% Si, 0.3–0.5% Y, 0–3% Re, 0–1% Nb, balance Ni; and the material used for the tip has a composition which is (i) the same as that of the metallic coating material, or (ii) equivalent to the metallic coating material and has a rare earth element content in the range of 5–1000 ppm, which is below the rare earth element content of the metallic coating material.

13. The tip material as claimed in claim 8, the material used for the tip has a rare earth element content in the range of 15–200 ppm.

14. The tip material as claimed in claim 9, wherein the material used for the tip has a rare earth element content in the range of 15–200 ppm.

15. The tip material as claimed in claim 11, wherein the material used for the tip has a rare earth element content in the range of 15–200 ppm.

16. The tip material as claimed in claim 12, wherein the material used for the tip has a rare earth element content in the range of 15–200 ppm.

17. The tip material as claimed in claim 1, comprising (i) an interface between the material used for the tip and the turbine blade and (ii) an interface between the material used for the tip and the metallic coating material.

18. The tip material as claimed in claim 17, wherein the turbine blade is a single crystal and a total misorientation between the turbine blade and the material used for the tip is not greater than 15°.

19. The tip material as claimed in claim 17, wherein the tip material is applied to an end surface of the turbine blade produced by removing damaged coated tip to provide the end surface on the turbine blade.

20. The tip material as claimed in claim 17, wherein the turbine blade is of a nickel-base superalloy.

* * * * *